United States Patent [19]
Stephenson

[11] Patent Number: 6,104,566
[45] Date of Patent: Aug. 15, 2000

[54] DIRECT ACCESS STORAGE DEVICE (DASD) WITH A VARIABLE SPINDLE ROTATION SPEED

[75] Inventor: John Jeffrey Stephenson, Rochester, Minn.

[73] Assignee: International Business Machines Corporation, Armonk, N.Y.

[21] Appl. No.: 08/989,471

[22] Filed: Dec. 12, 1997

[51] Int. Cl.[7] ................................. G11B 15/46
[52] U.S. Cl. ..................... 360/73.03; 360/73.01
[58] Field of Search ........................... 360/73.01, 73.03, 360/51, 71; 369/50, 47, 267, 54; 318/254

[56] References Cited

U.S. PATENT DOCUMENTS

| | | | |
|---|---|---|---|
| 4,357,707 | 11/1982 | Delury | 375/374 |
| 4,514,771 | 4/1985 | Stark et al. | 360/73.03 |
| 4,530,018 | 7/1985 | Hoshino et al. | 360/73.03 |
| 4,603,412 | 7/1986 | Yamazaki | 369/50 |
| 4,636,905 | 1/1987 | Morimoto et al. | 360/137 |
| 4,689,698 | 8/1987 | Ishikawa et al. | 360/69 |
| 4,710,825 | 12/1987 | Okita et al. | 360/73.03 X |
| 4,757,406 | 7/1988 | Stewart et al. | 360/51 |
| 4,918,743 | 4/1990 | Tsuyuguchi | 360/73.03 X |
| 5,204,593 | 4/1993 | Ueki | 318/254 |
| 5,289,097 | 2/1994 | Erickson et al. | 360/73.03 X |
| 5,293,275 | 3/1994 | Kawasaki | 360/51 |
| 5,379,166 | 1/1995 | Tsukada et al. | 360/73.03 X |
| 5,569,988 | 10/1996 | Kokami et al. | 318/254 |
| 5,585,701 | 12/1996 | Kaida et al. | 318/254 |
| 5,625,615 | 4/1997 | Dente et al. | 360/73.01 |
| 5,631,999 | 5/1997 | Dinsmore | 318/138 |
| 5,638,307 | 6/1997 | Kamimura et al. | 364/707 |
| 5,659,799 | 8/1997 | Wu et al. | 395/877 |
| 5,706,265 | 1/1998 | Bang | 360/73.03 X |

FOREIGN PATENT DOCUMENTS

| | | |
|---|---|---|
| 0653752A2 | 5/1995 | European Pat. Off. ........ G11B 19/00 |
| 60-253070 | 12/1985 | Japan . |
| 61-296573 | 12/1986 | Japan . |
| 2-71458 | 3/1990 | Japan . |
| 4-92254 | 3/1992 | Japan . |
| 06020384 | 1/1994 | Japan . |
| 06052622 | 2/1994 | Japan . |
| 7-334950 | 12/1995 | Japan . |
| 8-255414 | 10/1996 | Japan . |

OTHER PUBLICATIONS

Patent Abstracts of Japan, vol. 098, No. 003, Feb. 27, 1998 (JP 09 306084 A (Sharp Corp.), Nov. 28, 1997).

Patent Abstracts of Japan, vol. 014, No. 108 (E–0896), Feb. 27, 1990 (JP 01 308183 A (Asahi Optical Co. Ltd.), Dec. 12, 1989.

IBM Technical Disclosure Bulletin, vol. 21, No. 1, Jun. 1978, pp. 36–39, R.V. Ballou et al., "Dynamically Alterable Data Transfer Mechanism for Direct–Access Storage Device to Achieve Optimal System Performance".

IBM Technical Disclosure Bulletin, vol. 38, No. 12, Dec., 1995 pp. 191–192, "Servo Positioning for Variable Disk RPM".

IBM Technical Disclosure Bulletin, vol. 39, No. 6, Jun. 1996, pp. 147–149, "Spindle Rotation Optimization for Disk Write/Read Operation".

*Primary Examiner*—Andrew L. Sniezek
*Attorney, Agent, or Firm*—Joan Pennington

[57] ABSTRACT

A method and apparatus are provided for variable spindle rotation speed in a direct access storage device (DASD). The direct access storage device (DASD) includes a multi-phase, brushless, direct current (DC) spindle motor. Speed and commutation control signals are applied to a plurality of spindle motor drivers for normally operating the plurality of spindle motor drivers in saturation mode while performing read and write operations. A spindle rotational speed is detected and compared with a predetermined spindle speed range. Responsive to the detected spindle rotational speed being within said predetermined spindle speed range, normal operations of the direct access storage device (DASD) are enabled. One or more write sync fields are provided on each surface of a magnetic disk media. The write sync field is used for timing write operations in the direct access storage device.

13 Claims, 6 Drawing Sheets

DIRECT ACCESS STORAGE DEVICE (DASD) WITH A VARIABLE SPINDLE ROTATION SPEED

FIELD OF THE INVENTION

The present invention relates to a direct access storage device (DASD), and more particularly to method and apparatus for variable spindle rotation speed in a direct access storage device.

DESCRIPTION OF THE PRIOR ART

Direct access storage devices (DASDs) or hard drives are widely used with modern computers. Disk drive units often incorporating stacked, commonly rotated rigid magnetic disks, are used for storage of data in magnetic form on the disk surfaces. Data is recorded in radially spaced data information tracks arrayed on the surfaces of the disks. Transducer heads driven in a path toward and away from the drive axis write data to the disks and read data from the disks.

In today's disk drives the spindle motor rotational speed or motor revolutions per minutes (RPMS) typically is a fixed value, for example 7200 RPM. By fixing the spindle rotation speed value, all the other components are then designed to operate at that value. When designing the spindle motor and its control circuits the designer must be sure that every drive will always be able to operate at this fixed RPM at the worse case conditions. Examples of worse case conditions include the following. Power supply voltage can be +/−10%. The temperature range is 0–60 degrees Centigrade, which affects torque constant and drag. The motor and winding drag is assumed to vary as much as +/−50% from part to part. Coil, wiring, and power device resistance can vary as much as 20%. Motor torque constant can vary +/−5% from part to part.

Once all the worst case conditions are factored into the design, the resulting torque constant selected for the spindle motor must be smaller than it would be possible if nominal conditions were assumed. This selection of a smaller torque constant results in a larger run current being required, which results in a much larger file power requirement. For example, at least 20–30% more power is needed in order to design a disk drive so that it will operate at a given RPM under all operating conditions.

In battery operated systems, this larger file power requirement is an important factor, limiting the available stand alone battery life. In conventional systems, once the battery falls below a given value such that the fixed motor speed can not be maintained, then the disk file stops working.

SUMMARY OF THE INVENTION

A principal object of the present invention is to provide an improved method and apparatus for variable spindle rotation speed in a direct access storage device (DASD). Other important objects of the present invention are to provide such method and apparatus substantially without negative effects; and to provide such method and apparatus that overcome many of the disadvantages of prior art arrangements.

In brief, a method and apparatus are provided for variable spindle rotation speed in a direct access storage device (DASD). The direct access storage device (DASD) includes a multi-phase, brushless, direct current (DC) spindle motor. Control signals are applied to a plurality of spindle motor drivers for normally operating the plurality of spindle motor drivers in saturation mode while performing read and write operations. A spindle rotational speed is detected and compared with a predetermined spindle speed range. Responsive to the detected spindle rotational speed being within said predetermined spindle speed range, normal operations of the direct access storage device (DASD) are enabled. One or more write sync fields are provided on each surface of a magnetic disk media. The write sync field is used for timing write operations in the direct access storage device.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
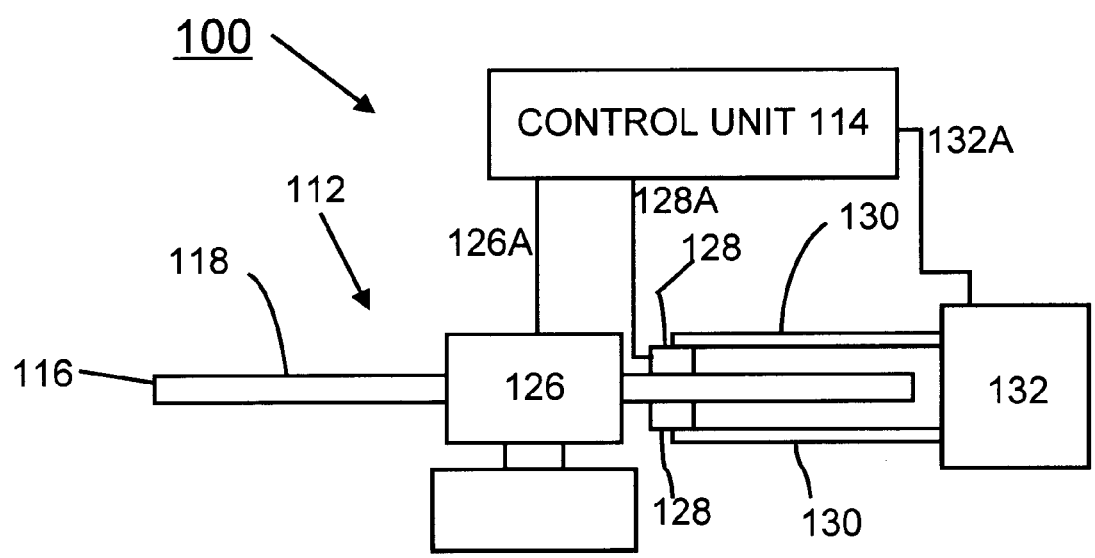
FIG. 1 is a schematic and block diagram of a data storage disk file embodying the present invention.

Having reference now to the drawings, in FIG. 1 there is illustrated a data storage disk file generally designated as 100 including a rigid magnetic disk drive unit 112 and an interface control unit generally designated as 114. Unit 112 is illustrated in simplified and diagrammatic form sufficient for an understanding of the present invention. The utility of the present invention is not restricted to the details of a particular drive unit construction.

The disk drive unit 112 includes at least one disk 116 having at least one magnetic surface 118. The disk 116 is mounted for rotation on and by an integrated spindle and motor assembly 126. Information on each magnetic disk surface 118 is read from or written to the disk surface 118 by a corresponding transducer head assembly 128 movable in a path having a radial component across the rotating disk surface 118. Each transducer head assembly 128 is carried by a suspension arm assembly 130. The suspension arm assemblies 130 are ganged together for simultaneous pivotal movement by a head drive servo motor 132 including a voice coil (not shown) cooperating with an internal magnet and core assembly. Drive signals applied to the voice coil cause the arms 130 to move in unison to position the transducer head assemblies 128 in registration with information storage tracks on the disk surfaces 118 where information is written or read.

The disk drive unit 112 is controlled in operation by signals provided by the control unit 114, including motor control signals on line 126A and head position control signals on line 132A. In a typical arrangement, control unit 114 provides an interface with a computer that provides data read and write commands, and data signals are transmitted to or from the transducer head assemblies 128 over corresponding lines 128A, one of which is seen in FIG. 1. Servo position information is recorded on the disk surfaces 118, and the transducer head assemblies 128 read this servo information to provide a servo position signal to the control unit 114. This information is employed by the control unit 114 to provide position control signals on line 132A.

Figure 2:
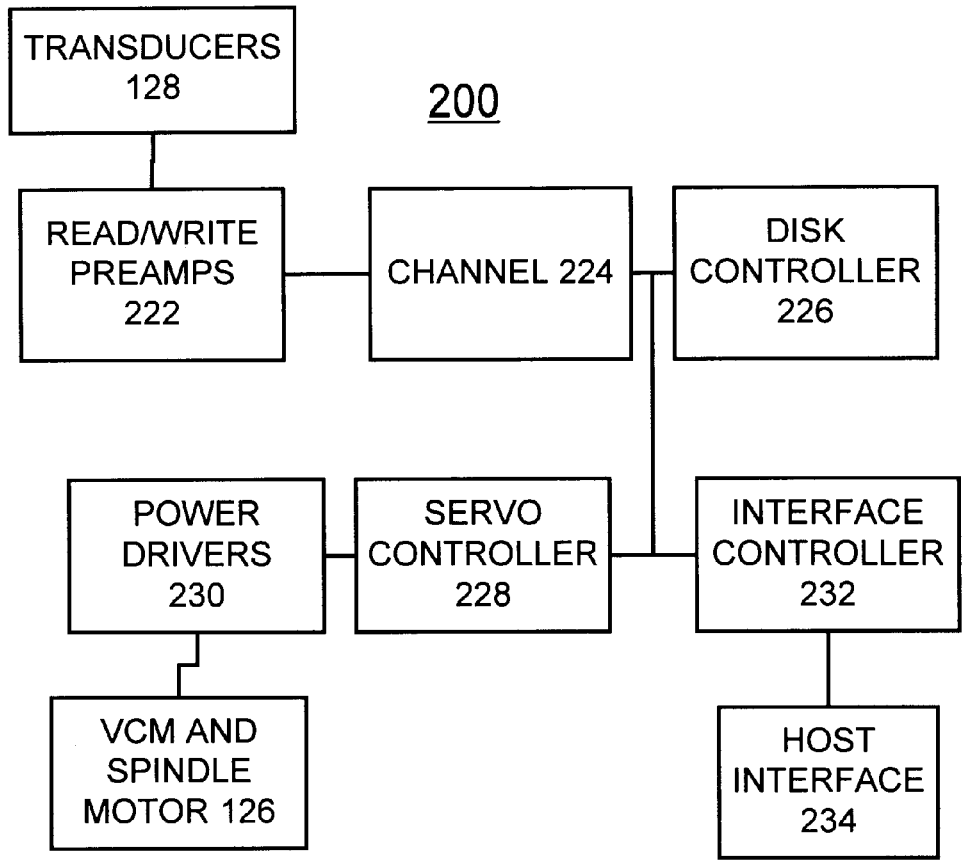
FIG. 2 is a block diagram illustrating the data storage disk file of FIG. 1 in accordance with the present invention.

Referring now to FIG. 2, there is shown a block diagram functional representation of the disk file 100 generally designated as 200 for carrying out the variable spindle rotation speed method of the invention. Servo information and customer data are read by the transducers 128 and amplified by read/write preamplifiers (preamps) 222. A data channel 224 uses sampling techniques of the preferred embodiment for detecting the readback signals from the disk surfaces 118 that contain the customer data. An embedded disk controller 226 is coupled to the data channel 224 and a servo controller 228. The servo controller 228 performs servo control functions providing servo positioning control signals to a power drivers block 230 coupled to the VCM and the spindle motor assembly 126. An interface controller 232 coupled to the disk controller 226 performs interface processor functions. A host interface 234 is coupled to the disk controller 226 via the interface controller 232.

In accordance with features of the invention, the disk file 100 is not limited to operate at a given RPM. In disk file 100, a predetermined wide operational range of spindle rotational speed is provided. For example, with a nominal RPM specification of 10,000 RPM, a minimum RPM specification of 8,000 RPM and a maximum RPM specification of 10,100 RPM can be provided. The nominal RPM specification is set close to the maximum RPM specification. The minimum RPM specification is set far below the nominal RPM specification. With a wider allowed range of spindle rotational speeds, more power savings are provided.

Figure 3:
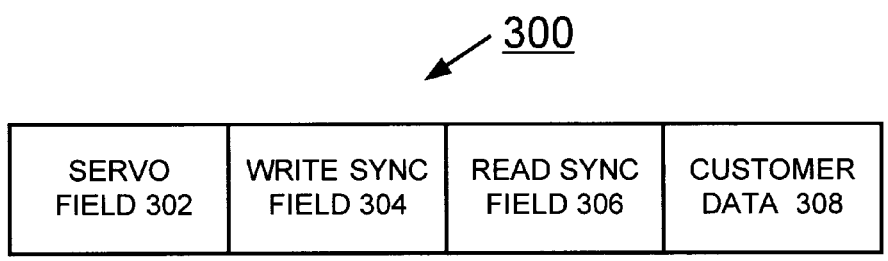
FIG. 3 is a diagram illustrating customer data format in accordance with the present invention.
Figure 7:
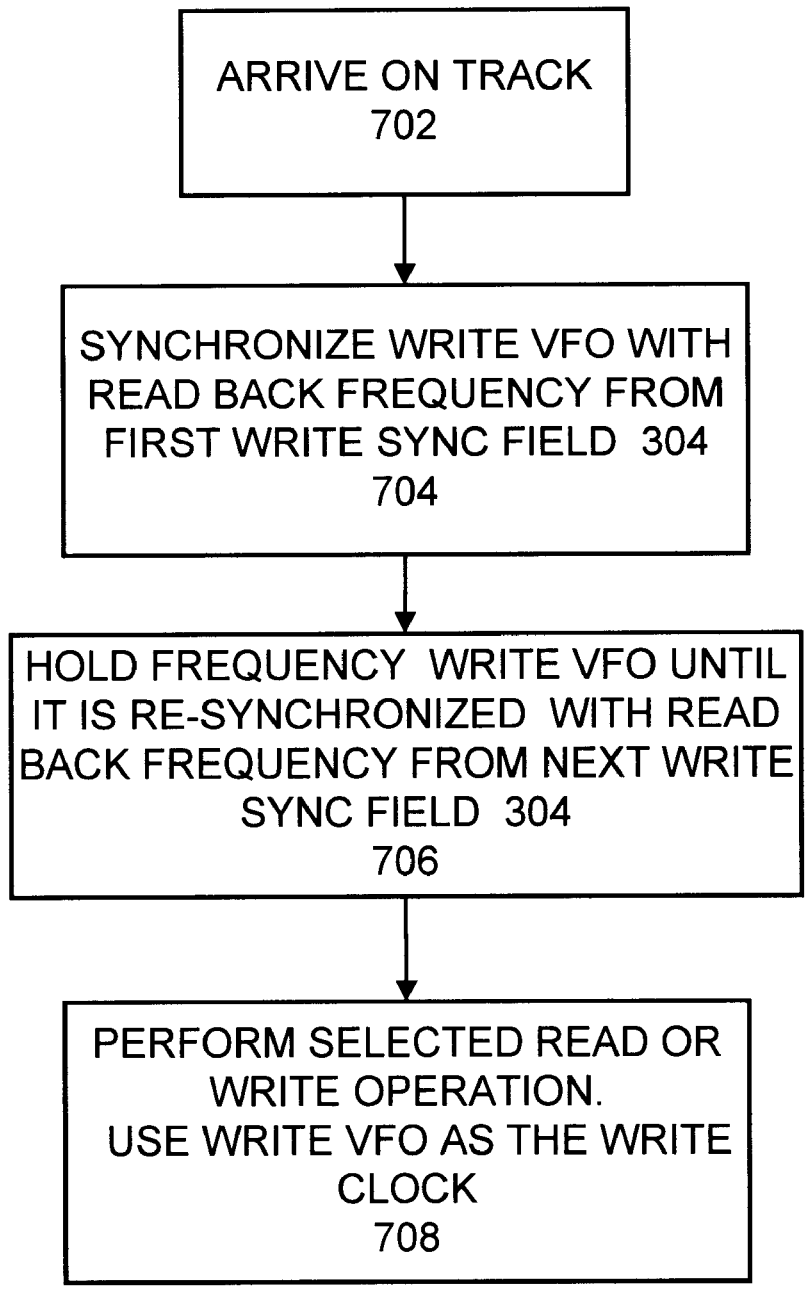
FIG. 7 is a flow diagram illustrating sequential steps for read and write operations in the data storage disk file of FIG. 1 in accordance with the present invention.

The data channel 224 is arranged to operate over a range of data frequencies that is wider than conventional disk files. Also an additional write sync field illustrated and described with respect to FIGS. 3 and 7, is required for timing data write operations. The servo controller 228 corrects for a variation in its sample rate based upon a detected spindle rotational speed. The servo controller 228 measures spindle RPM, and correction for sample rate variation is dynamically provided as it occurs.

In conventional battery operated systems once the battery falls below a given value such that the fixed spindle motor speed can not be maintained, then the file stops working. This invention allows the spindle motor to slow down as the battery runs down, while the drive continues to work until a predetermined low threshold spindle motor speed is reached. The predetermined low threshold spindle motor speed may correspond to a low voltage level where the logic modules would stop working. Also the battery life is about 20–30% longer with this invention as compared to conventional battery operated systems.

FIG. 3 illustrates a customer data format generally designated by 300 for carrying out the variable spindle rotation speed method of the invention. The customer data format 300 includes a servo field 302, a write sync field 304, a read sync field 306 together with customer data 308. The write sync field 304 is a new field needed for carrying out the variable spindle rotation speed control method of the invention. The write sync field 304 is written at the same time as with servo information during the manufacture of the disk file 100. The write sync field 304 is never rewritten, unlike the read sync field 306 that can be rewritten during the operation of the disk file 100. In the preferred embodiment, one write sync field 304 is written for each servo field 302. The use of the write sync field 304 during write operations of the disk file 100 is illustrated and described with respect to FIG. 7.

Figure 4:
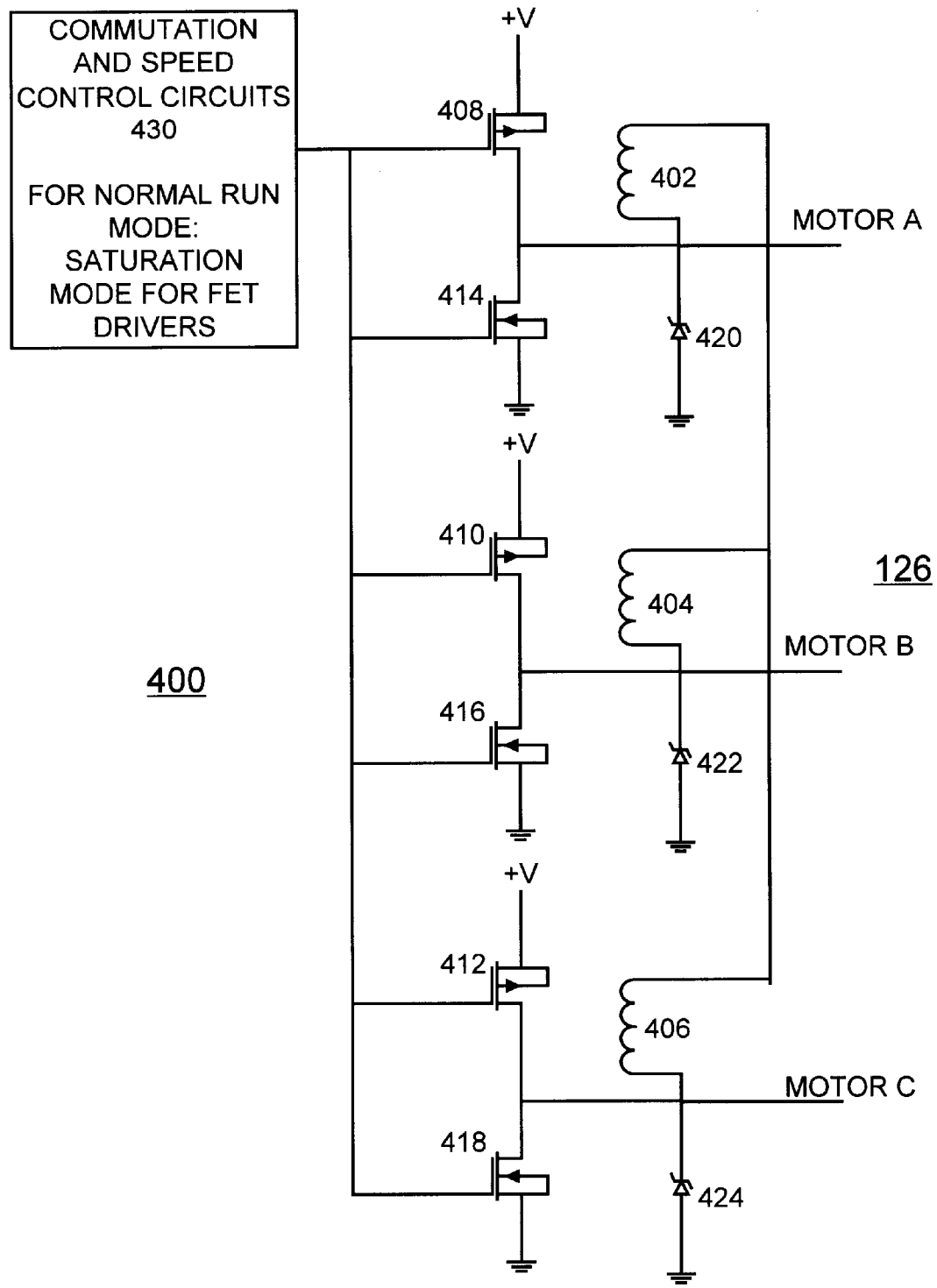
FIG. 4 is a schematic and block diagram illustrating exemplary spindle motor drive control apparatus for carrying out the variable spindle rotation speed in accordance with the present invention.

Referring now to FIG. 4, there is shown an exemplary spindle motor drive control apparatus generally designated by 400 for carrying out the variable spindle rotation speed control in accordance with the present invention. The spindle motor drive control apparatus 400 provides a control drive signal to the spindle motor 126 indicated at each line labeled MOTOR A, MOTOR B and MOTOR C. The spindle motor 126 includes three stator coils or motor windings 402, 404, and 406 connected with a common center tap in a Y-configuration. The spindle motor drive control apparatus 400 includes multiple driver transistors including a plurality of P-channel field effect transistors (FETs) 408, 410, and 412, a plurality of N-channel FETs 414, 416, and 418, and a plurality of Zener diodes 420, 422, and 424. The spindle motor drive control apparatus 400 includes a commutation and speed control circuits block 430 enabling the respective pairs of FETs 408, 414; 410, 416; 412 and 418 to operate in saturation mode during normal run mode of the disk file 100. The FETs 408, 410, 412, 414, 416, and 418 are respectively coupled to the motor windings 402, 404, and 406 and the Zener diodes 420, 422, and 424.

As a result of operating the FETs 408, 410, 412, 414, 416, and 418 in saturation mode, the need for complex pulse width modulation (PWM) and control circuits and the accompanying electronic noise of conventional spindle motor drivers are eliminated. Also as result of the lower overall power dissipation in the FETs 408, 410, 412, 414, 416, and 418 from operating in saturation mode, smaller FETs may be used than conventionally required.

In accordance with features of the invention, the spindle motor assembly 126, a multi-phase, brushless, direct current (DC) motor can be provided with a higher torque constant and a more efficient spindle motor than typically used with conventional disk files having a fixed spindle speed.

Figure 5:
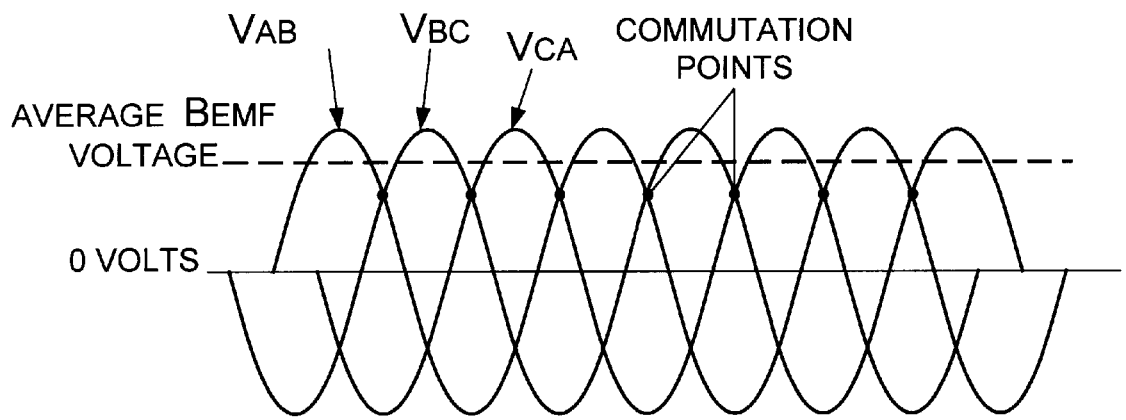
FIG. 5 is a diagram illustrating exemplary spindle back electromotive force (EMF) motor drive control signals for carrying out the variable spindle rotation speed in accordance with the present invention.

FIG. 5 illustrates exemplary spindle motor drive control signals for carrying out the variable spindle rotation speed in accordance with the present invention. In FIG. 5, there are shown three sine waves respectively labeled $V_{AB}$, $V_{BC}$, and $V_{CA}$, separated by 120° phase representing voltages at lines MOTOR A, MOTOR B and MOTOR C across respective sets or pairs of the motor windings 402, 404, and 406. Commutation points for switching between the respective pairs of FETs 408 and 414; 410 and 416; 412 and 418 are indicated by dots representing minimum back EMF voltage. Average back EMF voltage between the minimum and peak voltages is illustrated at a dashed line labeled AVERAGE $B_{EMF}$ VOLTAGE. The average back EMF voltage of the present invention typically equals the supply voltage +V minus the I*R losses of the sets of the motor windings 402, 404, and 406. In disk file 100, the peak back EMF plus the I*R losses is chosen to equal the nominal power supply voltage. The spindle rotational speed can be detected by measuring the time between zero-crossings of one of the sine wave signals $V_{AB}$, $V_{BC}$, or $V_{CA}$.

Figure 6:
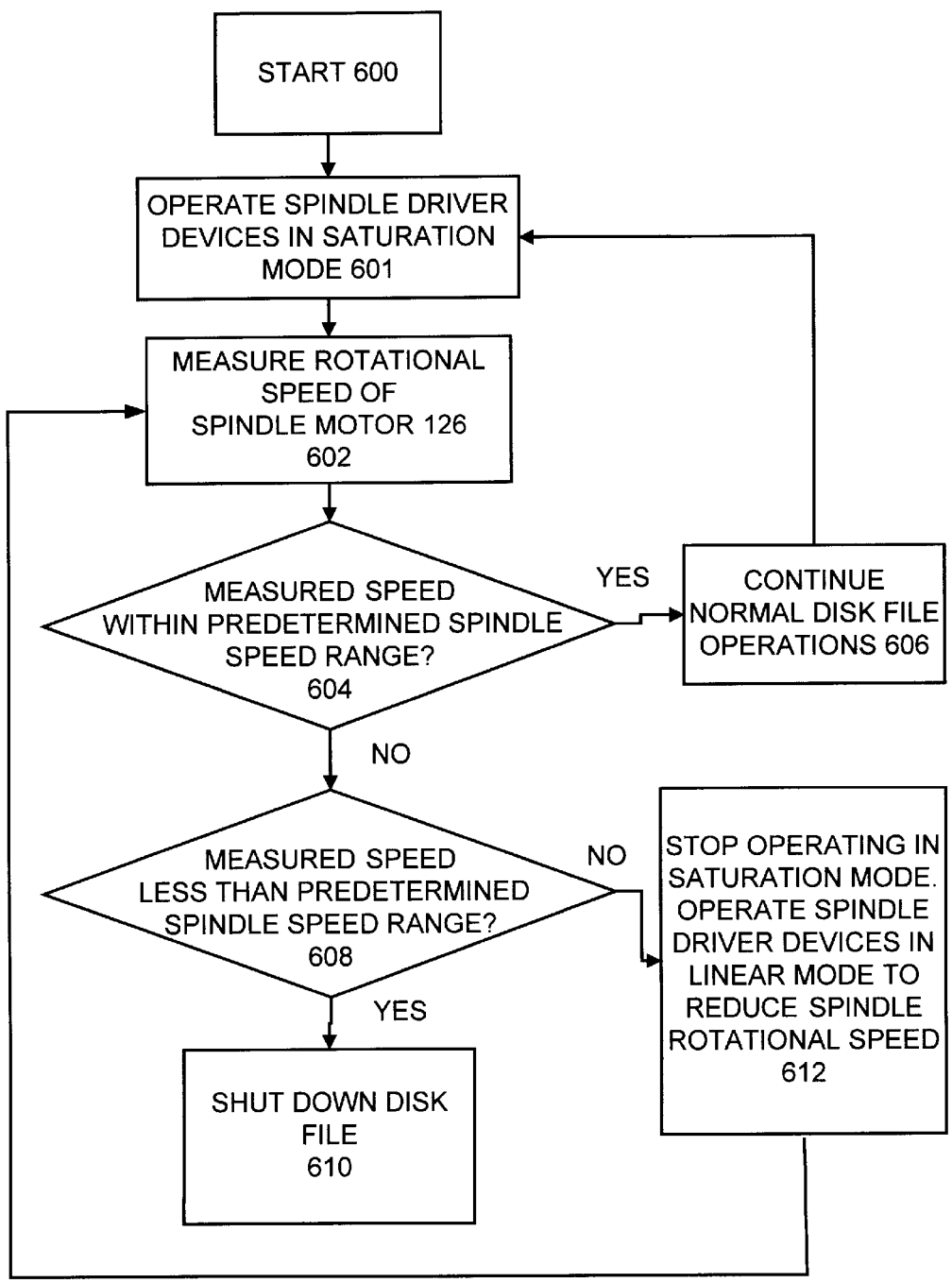
FIG. 6 is flow diagram illustrating exemplary sequential steps spindle motor drive control operations in the data storage disk file of FIG. 1 in accordance with the present invention.

Referring to FIG. 6, there are shown exemplary sequential steps for spindle motor drive control operations performed by the servo controller 228 in the data storage disk file 100 in accordance with the present invention. The spindle motor drive control operations start at a block 600 for functional operations of the disk file 100. The spindle driver devices are operated in saturation mode as indicated at a block 601. A spindle speed measurement is obtained as indicated at a block 602. The measured spindle speed is compared with the predetermined range of spindle rotational speeds for the disk file 100 as indicated at a decision block 604. If the measured spindle speed is within the predetermined range, then normal file operations are continued as indicated at a block 606. Then the operations return to block 601 to continue with operation of the spindle driver devices in saturation mode. If the measured spindle speed is outside the predetermined range, then the measured spindle speed is compared with the minimum and maximum spindle rotational speeds for the disk file 100 as indicated at a decision block 608. If the measured spindle speed is less than the minimum spindle rotational speed, then a file shutdown signal is generated as indicated at a block 610. If the measured spindle speed is greater than the maximum spindle rotational speed, then operation in the saturation mode is stopped and the spindle driver devices are operated in the linear mode to reduce the spindle rotational speed as indicated at a block 612. Then the operations return to block 602 to continue measuring the spindle rotational speed. Then the operations return to block 602 to continue with the measurement of the spindle rotational speed.

FIG. 7 is a flow diagram illustrating sequential steps for read and write timing operations in the data storage disk file 100 in accordance with the present invention. The sequential operations begin upon the arrival of the transducer 128 on track as indicated at a block 702. A data channel timing voltage frequency oscillator (VFO) is synchronized with the read back frequency from the first write sync field 304 as indicated at a block 704. The frequency is held until the write VFO is resynchronized with the read back frequency from the next write sync field 304 as indicated at a block 706. Then the selected read or write operation is performed as indicated at a block 708. For a write operation at block 708, the write VFO is used as the write clock.

While the present invention has been described with reference to the details of the embodiments of the invention shown in the drawing, these details are not intended to limit the scope of the invention as claimed in the appended claims.

What is claimed is:

1. A method for variable spindle rotation speed in a direct access storage device (DASD) including a multi-phase, brushless, direct current (DC) spindle motor comprising the steps of:

applying a control signal to a plurality of spindle motor drivers for normally operating said plurality of spindle motor drivers in saturation mode during normal read/write operations of the direct access storage device; said plurality of spindle motor drivers including respective pairs of field effect transistors connected to each respective winding of the multi-phase, brushless, direct current (DC) spindle motor; and said control signal normally operating said respective pairs of field effect transistors in saturation mode during normal read/write operation of the direct access storage device;

detecting a spindle rotational speed;

comparing said detected spindle rotational speed with a predetermined spindle speed range; and responsive to said detected spindle rotational speed being within said predetermined spindle speed range, enabling said normal read/write operations of the direct access storage device (DASD) and continue applying said control signal to said plurality of spindle motor drivers for normally operating said plurality of spindle motor drivers in saturation mode.

2. A method for variable spindle rotation speed in a direct access storage device (DASD) as recited in claim 1 wherein said enabled normal operations of the direct access storage device (DASD) include the steps of:

providing a write sync field on each surface of a magnetic disk media; and utilizing said write sync field for timing write operations in the direct access storage device.

3. A method for variable spindle rotation speed in a direct access storage device (DASD) as recited in claim 1 further includes the step responsive to said detected spindle rotational speed being outside said predetermined spindle speed range, for ending normal operations of the direct access storage device (DASD).

4. A method for variable spindle rotation speed in a direct access storage device (DASD) as recited in claim 1 further includes the step responsive to said detected spindle rotational speed being outside said predetermined spindle speed range, for applying an adjusted commutation control signal to said plurality of spindle motor drivers to change the spindle rotational speed.

5. A method for variable spindle rotation speed in a direct access storage device (DASD) as recited in claim 1 wherein said predetermined spindle speed range includes a maximum spindle speed of N and a minimum spindle speed of 0.8*N.

6. Apparatus for variable spindle rotation speed in a direct access storage device (DASD) including a multi-phase, brushless, direct current (DC) spindle motor comprising:

a plurality of spindle motor drivers for applying driving current to the spindle motor; said plurality of spindle motor drivers including respective pairs of field effect transistors connected to each respective winding of the multi-phase, brushless, direct current (DC) spindle motor;

speed and commutation control means for applying a control signal to said plurality of spindle motor drivers for normally operating said plurality of spindle motor drivers in saturation mode; and said speed and commutation control means for normally operating said respective pairs of field effect transistors in saturation mode during normal read/write operation of the direct access storage device;

means for detecting a spindle rotational speed;

means for comparing said detected spindle rotational speed with a predetermined spindle speed range; and means responsive to said detected spindle rotational speed being within said predetermined spindle speed range, for enabling normal operations of the direct access storage device (DASD) and to continue applying said control signal to said plurality of spindle motor drivers for normally operating said plurality of spindle motor drivers in saturation mode.

7. Apparatus for variable spindle rotation speed in a direct access storage device (DASD) as recited in claim 6 further includes means responsive to said detected spindle rotational speed being less than said predetermined spindle speed range, for ending normal operations of the direct access storage device (DASD).

8. Apparatus for variable spindle rotation speed in a direct access storage device (DASD) as recited in claim 6 further includes means responsive to said detected spindle rotational speed being greater than said predetermined spindle speed range, for applying an adjusted commutation control signal to said plurality of spindle motor drivers to reduce the spindle rotational speed.

9. Apparatus for variable spindle rotation speed in a direct access storage device (DASD) as recited in claim 6 further includes means for providing a write sync field on each surface of a magnetic disk media; and means, utilizing said write sync field for timing write operations in the direct access storage device.

10. A direct access storage device (DASD) comprising:

at least one disk mounted for rotation;

a transducer head mounted for movement across tracks recorded on the at least one disk, means for providing a write sync field on each surface of a magnetic disk media;

means, utilizing said write sync field for timing write operations in the direct access storage device;

a multi-phase, brushless, direct current (DC) spindle motor;

a plurality of spindle motor drivers for applying driving current to the spindle motor; said plurality of spindle motor drivers including respective pairs of field effect transistors connected to each respective winding of the multi-phase, brushless, direct current (DC) spindle motor; and speed and commutation control means for applying a control signal to said plurality of spindle motor drivers for normally operating said plurality of spindle motor drivers in saturation mode; and said speed and commutation control means for normally operating said respective pairs of field effect transistors in saturation mode during normal read/write operation of the direct access storage device.

11. A direct access storage device (DASD) as recited in claim 10 further includes:

means for detecting a spindle rotational speed;

means for comparing said detected spindle rotational speed with a predetermined spindle speed range; and means responsive to said detected spindle rotational speed being within said predetermined spindle speed range, for enabling normal operations of the direct access storage device (DASD) and to continue applying said control signal to said plurality of spindle motor drivers for normally operating said plurality of spindle motor drivers in saturation mode.

12. A direct access storage device (DASD) as recited in claim 11 further includes:

means responsive to said detected spindle rotational speed being less than said predetermined spindle speed range, for ending normal operations of the direct access storage device (DASD).

13. A direct access storage device (DASD) as recited in claim 11 further includes:

means responsive to said detected spindle rotational speed being outside said predetermined spindle speed range, for applying an adjusted commutation control signal to said plurality of spindle motor drivers to change the spindle rotational speed.

* * * * *